ns the oxid

United States Patent

Wessel et al.

[11] 3,973,529
[45] Aug. 10, 1976

[54] REDUCING NOXIOUS COMPONENTS FROM THE EXHAUST GASES OF INTERNAL COMBUSTION ENGINES

[75] Inventors: Wolf Wessel, Schwieberdingen; Rudolf Schwämmle, Korntal; Hans Schnürle, Walheim; Heinrich Knapp, Leonberg-Silberberg, all of Germany

[73] Assignee: Robert Bosch G.m.b.H., Stuttgart, Germany

[22] Filed: June 18, 1974

[21] Appl. No.: 480,582

[30] Foreign Application Priority Data
July 3, 1974 Germany............................ 2333743

[52] U.S. Cl. ............................. 123/32 EA; 60/276
[51] Int. Cl.² ............................................ F02B 3/00
[58] Field of Search ............... 123/32 EA, 119 R; 60/276, 285

[56] References Cited
UNITED STATES PATENTS

| | | | |
|---|---|---|---|
| 3,616,274 | 10/1971 | Eddy | 60/276 |
| 3,738,341 | 6/1973 | Loos | 123/140 MC |
| 3,759,232 | 9/1973 | Wahl et al. | 60/276 |
| 3,782,347 | 1/1974 | Schmidt et al. | 60/276 |
| 3,827,237 | 8/1974 | Linder et al. | 123/32 EA |
| 3,828,749 | 8/1974 | Knapp | 123/140 MC |
| 3,875,907 | 4/1975 | Wessel et al. | 123/32 EA |

*Primary Examiner*—Wendell E. Burns
*Assistant Examiner*—David D. Reynolds
*Attorney, Agent, or Firm*—Flynn and Frishauf

[57] ABSTRACT

Control systems in which transition between oxidizing and reducing state of the exhaust gases is sensed, and the input to the engine modified in accordance with sensed exhaust gas composition utilize a sensor which has an output signal having a transition jump, the extent of the jump being highly temperature dependent; in accordance with the invention, a signal is derived representative of change in level of the transition jump, as a function of temperature, and the control circuit responsive to the transition jump, and controlling input to the engine is modified in accordance with the signal repesentative of level change of the transition jump, to compensate for temperature-dependent changes.

23 Claims, 10 Drawing Figures

REDUCING NOXIOUS COMPONENTS FROM THE EXHAUST GASES OF INTERNAL COMBUSTION ENGINES

CROSS REFERENCE TO RELATED PATENTS AND APPLICATIONS

U.S. Pat. No. 3,483,851, Reichardt, Dec. 16, 1969
U.S. Pat. No. 3,759,232, Wahl et al, Sept. 18, 1973
U.S. Ser. No. 259,134, filed June 2, 1972, Topp et al
U.S. Pat. No. 3,782,347, Schmidt et al, Jan. 1, 1974
U.S. Ser. No. 271,009, filed July 12, 1972, Scholl
U.S. Ser. No. 316,008, filed Dec. 18, 1972, Friese et al
U.S. Ser. No. 447,475, filed Mar. 4, 1974, Pallner et al The present invention relates to a method and to a system to reduce the noxious components in the exhaust emission of internal combustion engines, in which a controller is used which integrates output signals from oxygen sensors located in the exhaust system of the engine, and in which the sensor provides output signals which are highly temperature dependent.

It has previously been proposed to control the mass ratio ($\lambda$) of the air and fuel of the air-fuel mixture applied to an internal combustion engine in dependence on the composition of the exhaust gases from the engine. As known, a sensor is placed in the exhaust stream of the exhaust gases from the internal combustion engine, and connected to a controller which, dependent on an electrical output signal derived from the sensor, changes the mass ratio of the then applied air-fuel mixture. This change of the mass ratio may be carried out by either increasing or decreasing the respective quantity of air or fuel of the mixture being applied to the engine. This change can be carried out, as known, in internal combustion engines in which the mixture is provided by a carburetor, as well as in engines in which the mixture is provided by fuel injection systems. The type of control system to control the mass ratio of the fuel-air mixture being used usually includes an integrating circuit, that is, the controller is an integrating controller, so that any deviation of the composition of the exhaust gases during extended periods of time results in increased correction of the mass ratio of the fuel-air mixture being applied to the internal combustion engines.

The sensors used in such systems usually provide a high output voltage when the air-fuel mixture is rich, that is, has an excess of CO and HC components ($\lambda <$ 1), and provides a low voltage when the air-fuel mixture is lean ($\lambda < 1$). The transition from high to low voltage is abrupt and sudden at the stoichiometric value $\lambda = 1$ since, in only slightly greater numbers, unburned oxygen is suddenly present in the exhaust gas.

Controlling the air number $\lambda$, that is, the composition of the fuel-air mixture to a value which is just below $\lambda = 1$, typically to a value of about 0.98, low emission of CO and HC components in the exhaust is obtained. The exhaust system of the engine requires only a simple thermo reactor to burn any of those components. A slight excess of CO remains, however, so that the exhaust gases being applied to a second reactor, of the catalytic type, are slightly reducing. A slightly reducing composition of the exhaust gases provides for optimum effect of the second, catalytic reactor.

The accuracy of the $\lambda$ control just described depends on the nature of the output signal derived from the exhaust sensor. The output signals from exhaust sensors are highly temperature dependent, that is, the high value of the output signal varies greatly with temperature. The output signal of the exhaust sensor also changes due to aging of the sensor and wear or contamination thereof. Change in the output signal of the sensor results in inaccuracies in control of the composition of the air-fuel mixture, so that this control of the air-fuel mixture will no longer be an optimum, with respect to composition of exhaust gases.

It is an object of the present invention to provide a method and a system to largely or wholly eliminate influences which distort the control of the air-fuel mixture.

It has been found that change in the output temperature, which is essentially responsible for change in the output signal from the exhaust sensor is frequently due to change in loading on the internal combustion engine, assuming that the exhaust system of the internal combustion engine has reached operating temperature.

Subject matter of the present invention:

Briefly, a correction signal is generated which modifies the control action of the air-fuel proportioning control system; typically, the control system includes a reference element and the correction signal modifies the reference signal used in the control method and system. In accordance with a feature of the invention, the correction signal is derived by sensing temperature of exhaust gases in the exhaust signal; in accordance with another feature of the invention, the correction signal is derived by sensing loading on the internal combustion engine.

The system in accordance with the present invention should be reliable, simple and suitable for the rough and varied operating conditions encountered in automotive vehicles. In accordance with a feature of the invention, therefore, the system uses an amplifier connected as a comparator, typically an operational amplifier, having the output signal from an exhaust gas sensor connected to one terminal thereof, the second terminal being connected to a reference signal source and to a correction unit supplying a correction signal modifying the signal derived from the reference signal source.

The invention will be described by way of example with reference to the accompanying drawings, wherein.

Figure 1:
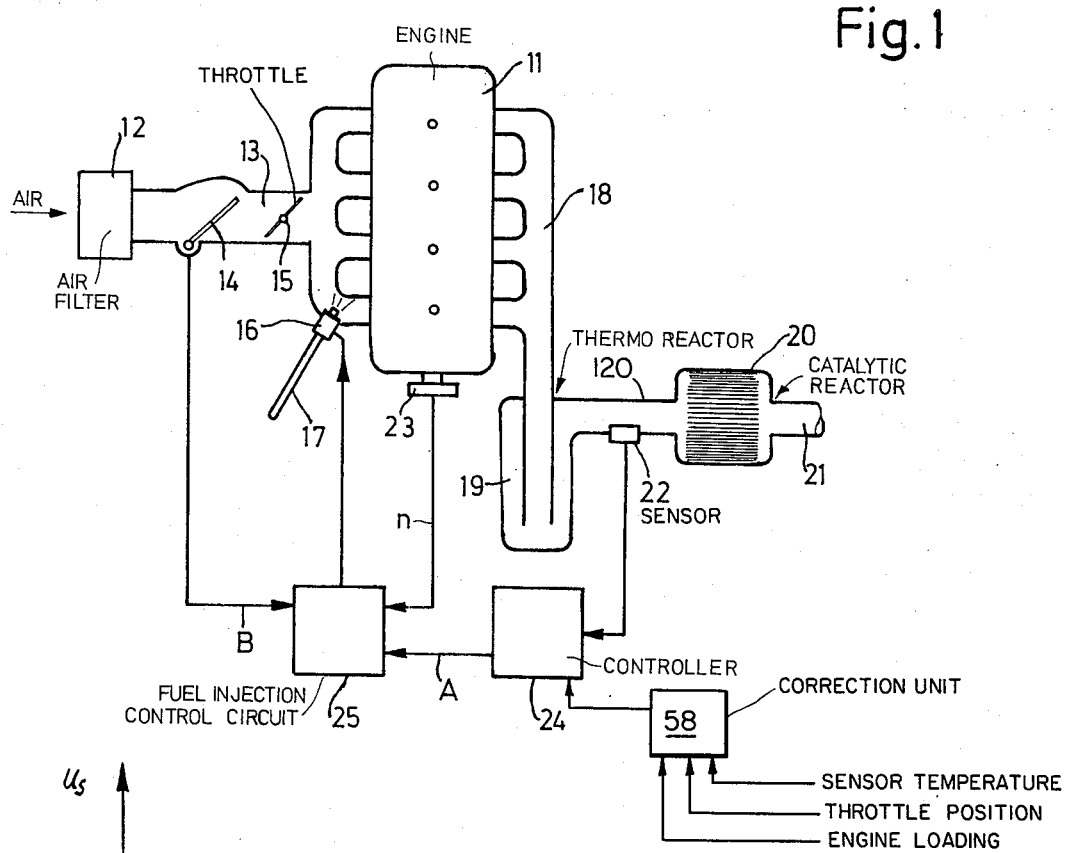
FIG. 1 is a highly schematic view of an exhaust gas detoxification system in which the present invention is used.

The system will be explained in connection with a four-cylinder internal combustion engine 11 (FIG. 1). Air is provided over a filter 12 to an inlet manifold 13. Throttle 15 controls the amount of inlet air, and is controlled by means of a control element, such as an accelerator pedal (not shown). An air quantity sensing element, shown as an air flow flap 14, is located in the inlet manifold between throttle 15 and air filter 12, and providing an electrical output. The cylinders of the internal combustion engine 11 have injection valves 16 associated therewith, injecting fuel immediately in advance of the inlet valves of the cylinders. Only one of the valves 16 is shown in FIG. 1; the valves 16 are supplied from fuel lines 17, shown schematically.

Exhaust manifold 18 is connected to the cylinders of the internal combustion engine 11 and, in turn, connected to a thermo reactor 19. The output of thermo reactor 19, which in its simplest form is an insulated portion of the exhaust manifold 18 and, typically, is an after-burner, is connected to catalytic reactor 20. The catalytic reactor 20 is connected to the exhaust system of the internal combustion engine, that is, to the muffler and tailpipe thereof.

A sensor 22 is located in the exhaust system ahead of the catalytic reactor 20. Sensor 22 is connected to a controller 24. A tachometer generator 23 provides a speed dependent output signal, schematically indicated by $n$ to a fuel injection control circuit 25. The output from controller 24 is connected to an input A of fuel injection control circuit 25, another input B of which is connected to the air quantity sensor 14. The fuel injection control circuit 25, typically transistorized, provides output pulses in synchronism with the rotation of the crankshaft of the engine to the fuel injection valves 16; the duration of the opening times of the valves 16 determines the amount of fuel being injected. This opening time of the valves 16 is controlled by the output voltage of the air quantity sensor 14 as well as by the controller 24 (and may be further controlled by other engine operation, or operating parameters, for example engine temperature). The injection valve 16 is operated by means of a solenoid winding, connected to the output of fuel injection control circuit 25.

Figure 2:
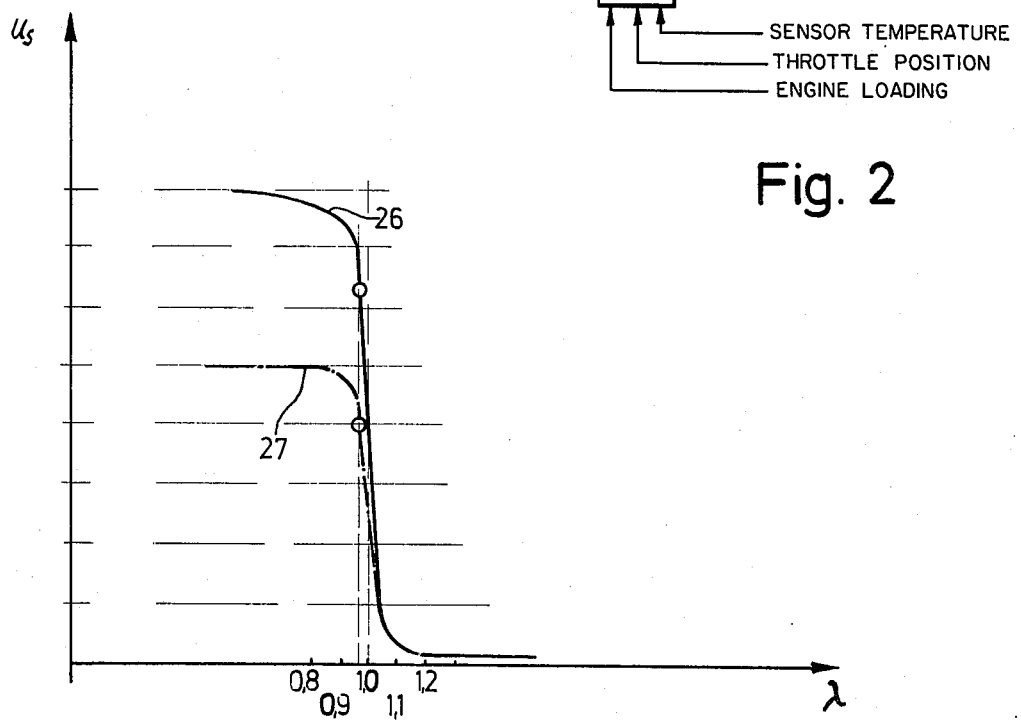
FIG. 2 is a voltage (ordinate) vs. air number $\lambda$ (abscissa) diagram of the output signal from an exhaust gas sensor, showing temperature dependence thereof.

The voltage-air number $\lambda$ diagram of a typical sensor is seen in FIG. 2, in which curve 26 illustrates the voltage relationship when the exhaust temperature is high, for example 500°C; chain-dotted curve 27 is a similar curve for a low exhaust gas temperature, for example about 350° C. The diagram clearly shows the change in output voltage of sensor 22 upon transition of the mixture in the exhaust from an air number $\lambda < 1$ to an air number $\lambda > 1$. At the air number $\lambda = 1$, the output voltage of sensor 22 drops abruptly to a low value. In the range of a lean air-fuel mixture, the air number remains at this low value. The diagram also clearly shows that the output voltage of the sensor, when the exhaust gases are in the rich range, varies greatly with temperature. Loading of the engine 11 has a substantial effect on the temperature of the exhaust gases from engine 11. Thus, even new sensors will provide different output voltages, when the exhaust gas composition is rich, in dependence on different loading of the engine. The output voltage from the sensor further is affected by age of the sensor, wear and contamination thereof, which cause a decrease in output voltage when the sensor should be in its high range ($\lambda < 1$).

Figure 3:
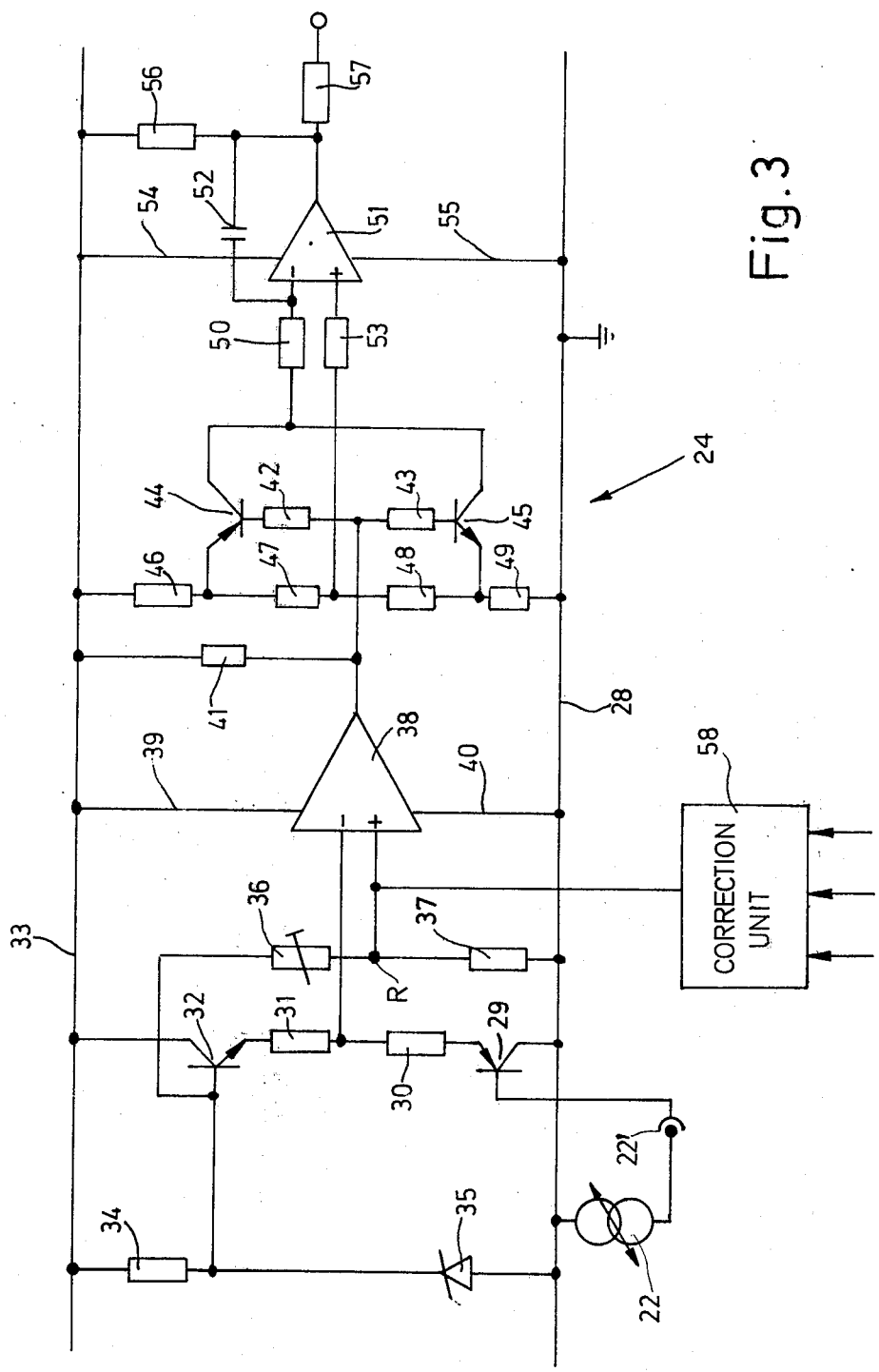
FIG. 3 is a schematic block diagram of a control system to control the air number $\lambda$ and showing the connection of a correction unit.

A general control circuit 24 is shown in detail in FIG. 3, to which reference will be made. Sensor 22 has one terminal connected to a common or chassis or ground bus 28; the second terminal of sensor 22 is connected by means of a connector 22' to the base of a transistor 29, the collector of which is also connected to common bus 28. The emitter of transistor 29 is connected to the series circuit of two resistors 30, 31 which have a common junction forming the tap point of a voltage divider defined by resistors 30, 31. The resistor 31 is further connected to the emitter of a transistor 32, the collector of which connects to positive common bus 33, typically connected to the battery of the motor vehicle. The base of transistor 32 is connected over a resistor 34 to bus 33, and to the cathode of a Zener diode 35, the anode of which connects to common bus 28. Two resistors 36, 37, of which resistor 36 is a variable or adjustable resistor, and forming a voltage divider, are connected between the base of transistor 32 and bus 28. The junction between resistors 30, 31 is connected to the inverting input of an operational amplifier 38; the junction between resistors 36, 37 and forming a reference junction R is connected to the direct input of operational amplifier 38. Operational amplifier 38 will thus operate as a comparator-amplifier. Its power supply connections are indicated by lines 39, 40, connected to buses 28, 33, respectively.

The switching threshold of operational amplifier 38 is determined by the voltage at reference junction R, as determined by the voltage applied across the voltage divider 36, 37. When the voltage at the common junction between resistors 30, 31 reaches the voltage threshold at reference terminal R, operational amplifier 38 will switch from one state to a second switching state. The switching state of operational amplifier 38 is sensed by the voltage across load resistor 41. Load resistor 41 is connected to common bus 33, and to the output of the amplifier 38.

The output of operational amplifier 38 is further connected to the junction point of two resistors 42, 43, the other terminals of which are connected to the bases of transistors 44, 45, the resistors 42, 43 forming the base resistors therefor. The emitter of transistor 44 is connected to the junction point of two series connected resistors 46, 47; the emitter of transistor 45 is connected to the junction point of two series connected resistors 48, 49. The four resistors 46, 47; 48, 49 form a combined series circuit connected between the common supply lines 33 and 28. The collectors of transistors 44, 45 are connected together and to a resistor 50 which forms the input resistor for the inverting input of a second operational amplifier 61. The inverting input and the output of the operational amplifier 51 are connected over an integrating capacitor 51. The direct input of operational amplifier 51 is connected to input resistor 53 which is connected to the junction point of the resistors 47, 48. Operational amplifier 51 is supplied over lines 54, 55 from buses 33, 28, respectively. The output of operational amplifier 51 is connected to load resistor 56, and to an output resistor 57. Output resistor 57 connects to a terminal which supplies a control signal to a control element which changes the amount of fuel or air, and hence the fuel-air ratio of the mixture being applied to the internal combustion engine; for example, terminal 57 can be connected to a resistor in the transistor circuit 25, voltage change at the output of operational amplifier 51 controlling the resistance relationships within circuit 25 and hence the injection time during which a fuel injection valve 16 remains open.

Operational amplifier 38 is connected as a comparator. The direct or reference input thereof is further connected to a correction unit 58 which changes the reference threshold of the operational amplifier 38, that is, which modifies the voltage at reference junction R, in dependence on paramters such as temperature, or loading of the engine. As a result, if an operating paramter representative of load of the engine changes, the voltage at the direct input to operational amplifier 38 is likewise changed, thus shifting its reference level.

Zener diode 35 provides a reference voltage. The voltage, therefore, across resistors 36, 37 is highly accurate so that, barring a signal from unit 58, the voltage at junction R being applied to the direct input of the operational amplifier is accurate, thus accurately determining the switching threshold level of operational amplifier 38. The emitter-follower connected transistor 29 applies the output voltage from the sensor 22 to the inverting input of operational amplifier 38. The emitter-base voltage of transistor 29 is added to the voltage from sensor 22. This voltage of $U_{EB}$ of transistor 29 must be compensated; transistor 32 is used to compensate this temperature dependent voltage. The emitter resistors 30, 31 of transistors 29, 32 are so dimensioned that the resistance values of the two resistors is equal. The input signal to the inverting input of operational amplifier 38 is thus essentially independent of temperature variations due to changes in ambient temperature levels of the various components in the circuit. If the operational amplifier 38 should switch over at a predetermined output voltage of the oxygen sensor 22 between one switching state to the other, resistor 37 and resistor 36 are relatively so adjusted that, for this particular output voltage of the sensor 22, the voltage difference between the two inputs to the operational amplifier 38 will be zero or null. If the output voltage of the oxygen sensor 22 exceeds this threshold, a negative difference voltage will be applied to the operational amplifier which will switch over to the other switching state. If the output voltage of the oxygen sensor 22 drops below the set threshold value, a positive difference voltage of the operational amplifier 38 will switch it over into its other switching state. The output of the operational amplifier will thus be determinative of whether the output voltage of the oxygen sensor is above or below a desired threshold level.

The output signal from the operational amplifier 38 is applied to operational amplifier 51 over the network formed of transistors 44, 45 and resistors 42, 43; 46, 47, 48, 49. The network formed of transistors 44 and 45 and resistors 42, 43, 46, 47, 48 and 49 is used to match the voltage level of the output from operational amplifier 38 to a desired level for the operational amplifier 51. For example, if the output signal of operational amplifier 38 is positive, transistor 45 is conductive, and resistor 50 will have a current flow therethrough from the inverting input of the operational amplifier 51. Due to feedback of the output signal of the operational amplifier 51 to the inverting input over integrating capacitor 52, a linear change in the output voltage of operational amplifier 51 will result. At a negative output signal from the operational amplifier 38, transistor 44 will become conductive and operational amplifier 51, operating as an integrator, will integrate in the opposite direction. The signal at the output of operational amplifier 51 thus changes in one or the other direction. This signal is applied to the transistor circuit 25 to change the open time of the fuel injection valve 16.

The output signal of the operational amplifier 51 can also be used to control the composition of the fuel-air mixture applied to engines which utilize a carburetor, for example by mechanically changing the composition of fuel and air. As an example, an electromagnetically operated transducer, or positioning element can be inserted into the fuel supply, or into the air supply to the engine, to change fuel and air supply, or to permit the addition of additional bypass air, bypassing the carburetor or, for example, additional air may be added to the exhaust gases to provide a stoichiometric mixture with minimum noxious components.

A signal applied from correction unit 58 to the reference junction R will shift the switching threshold of the operational amplifier. Various circuits can be used to introduce such a correction signal. In the subsequent Figures to be described, the elements common to the system of FIG. 3 have been reproduced in part; since their function is similar to that previously described, they have been given the same reference numerals and will not be described again.

Upon change in loading on the internal combustion engine 11, the temperature of the exhaust gases from the engine will change. This change in temperature results in a change of the maximum value of the output voltage of the oxygen sensor, in time. The switching threshold of the operational amplifier thus would have to be matched to the lowest possible voltage expected to be received from sensor 22. If the temperature of sensor 22 changes, a switching threshold then appropriate for the operational amplifier 38 would no longer correspond to an air-fuel composition mixture, that is, a value of λ which provides optimum exhaust gas composition. Such change in temperature of the sensor would thus result in a change in exhaust gas composition, deviating from the optimum. The correction unit 58 then changes the threshold level of the operational amplifier 38 in dependence on temperature of the sensor 22.

Figure 4:
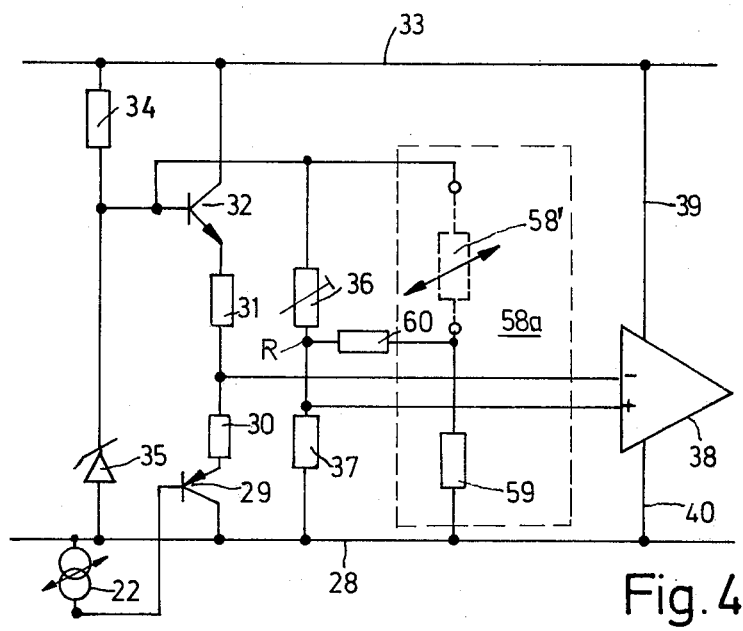
FIG. 4 is a fragmentary schematic circuit diagram of one embodiment of a correction unit.

Referring to FIG. 4, a negative temperature coefficient (NTC) resistor 58' is provided, used in the correction unit 58a, which further includes a resistor 59, connected in series with NTC resistor 58' and a resistor 60 connecting the junction between the NTC resistor 58' and resistor 59 with the junction of resistors 36, 37, that is, junction R. The resistors 58' 59 are connected in parallel to the resistors 36, 37 of the voltage divider and interconnected therewith by the resistor 60. The NTC resistor 58' is located to be sensitive to the temperature of sensor 22, for example by measuring the temperature of the exhaust gases. Depending on the sensed temperature of the exhaust gases, the voltage at the top or junction point resistors 58' and 59 will change; this change in voltage raises the voltage at the junction point between resistors 58', 59 when the temperature is high; when the temperature is low, the voltage is low. At low temperature, therefore, the switching threshold level is influenced by connection of the voltage over resistor 60 in such a manner that the direct input of the operational amplifier has a lower voltage applied; at high temperatures, a higher voltage is applied to the direct input of operational amplifier 38, which input determines the switching threshold level.

Thus, at high temperatures of the exhaust gases of the internal combustion engine, the switching threshold level of the operational amplifier is higher; at low temperatures, the switching threshold is less.

The condition of loading on the internal combustion engine is determined by the position of the operator control element (for example the accelerator or gas pedal) which, in turn, controls the position of the throttle 15 in the induction pipe or inlet manifold 13 of engine 11. The switching threshold level of operational amplifier 38 can, therefore, also be changed in dependence on the position of the throttle or the position of the accelerator control of engine 11, respectively. It is sometimes desirable to provide for some time delay of correction of the threshold level of operational amplifier 38 with respect to movement of throttle 15 (or accelerator control, respectively).

Figures 5, 5A:
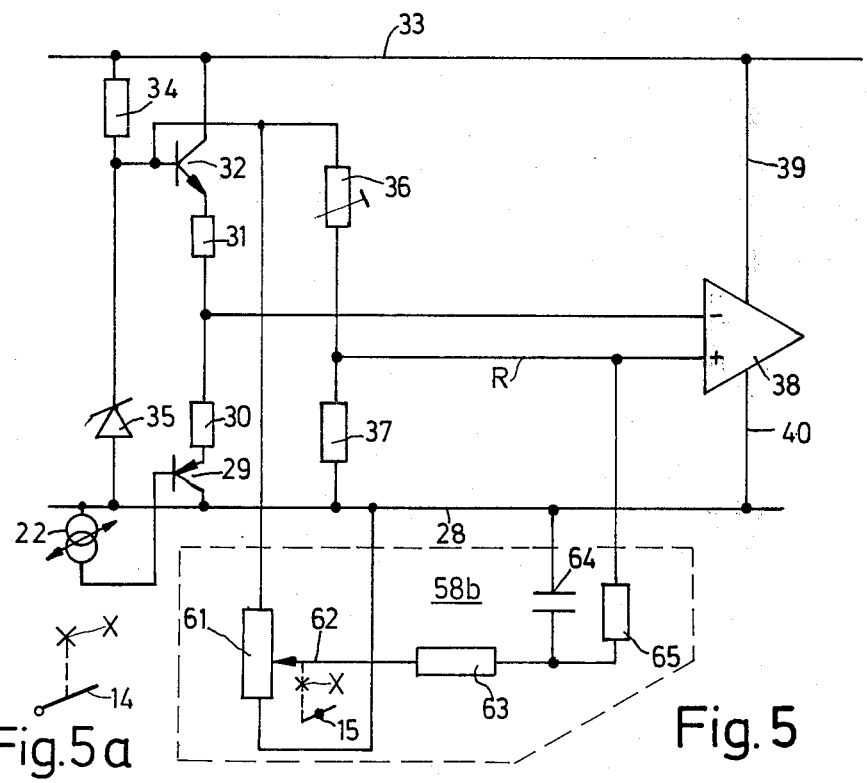
FIG. 5 is a schematic circuit diagram of another embodiment of a correction unit.
FIG. 5a is a fragmentary diagram showing a modification of the diagram of FIG. 5 to base the correction on a different input parameter.

Referring now to FIG. 5 where a control unit 58b is shown: A potentiometer-type controlled resistance valve resistor 61 is connected in parallel to the voltage divider formed of resistors 36, 37. The movable slider 62 of resistor 61 is connected to a coupling element, shown in dashed lines, to move in synchronism with movement of the throttle 15. The coupling element can be broken at point X. The slider connection 62 is coupled over resistor 63 with capacitor 64 which has its other terminal connected to chassis bus 28. Resistor 63 is further connected over coupling resistor 65 which connects to the reference junction R, and hence to the direct input of operational amplifier 38. As seen in FIG. 5, if the throttle is completely open, a positive voltage is applied over resistors 63, 65, so that the threshold level of the operational amplifier is shifted towards a higher voltage. When the throttle is in idle position, the threshold level is shifted towards a lower value. The capacitor 64, together with the resistors, provided a certain delay of application of the control signal to reference junction R with respect to changes of the position of slider 62, coupled to the accelerator or throttle 15.

Figure 6:
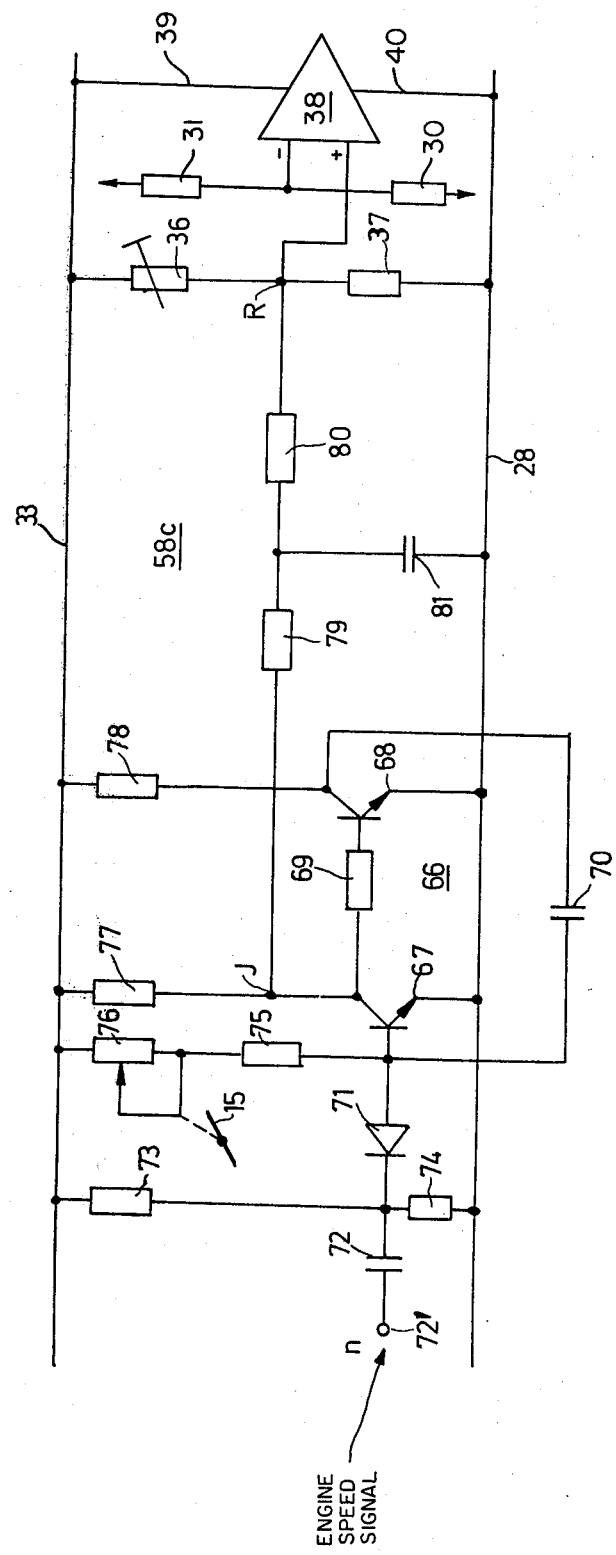
FIG. 6 is a schematic circuit diagram of another embodiment of a correction unit.

The gas flow through the internal combustion engine is a better indirect measure for loading of the internal combustion engine than merely position of the throttle as such. A signal representative of gas flow through the internal combustion engine can be obtained by forming a composite of a signal representative of speed of the internal combustion engine 11 as well as of position of the throttle as such. Referring to FIG. 6, wherein correction unit 58c is shown, correcting the threshold value of operational amplifier 38 in dependence on both speed and throttle position: A monostable flip-flop (FF) 66 is controlled by a speed signal n applied at terminal 72'. Monostable flip-flop 66 has two transistors 67, 68; a capacitor 70 is connected between the collector of transistor 68 and the base of transistor 67. The base of transistor 67 is triggered from speed signal n, applied to terminal 72' and connected over a capacitor 72 and a diode 71. The speed signal is derived, for example, from the breaker contact of the ignition system of the internal combustion engine. Two resistors 73, 74 are connected, in series, across the supply buses 28, 33, the junction point thereof being connected to the junction of capacitor 72 and diode 71. The base of transistor 67 is further connected to positive bus 33 over the series circuit formed by a resistor 75 and a potentiometer 76. The potentiometer 76 has its slider connected to move in synchronism with movement of the throttle 15, as shown, schematically, by the dashed lines. The collectors of the transistors 67, 68 are connected to positive bus 33 over collector resistors 77, 78, respectively. The collector of transistor 67 is further connected to a junction J, and over a resistor-capacitor network formed by resistors 79, 81, 80 to the junction R and hence to the direct input of the operational amplifier 38. The R/C network formed of series connected resistors 79, 80 and the intermediately connected capicitor 81 form a low-pass filter.

Operation of circuit of FIG. 6: Upon each ignition pulse, or ignition event of the motor, capacitor 72 and resistors 73, 74, forming a differentiating network, will trigger the monostable FF 66. The monostable FF will thus provide pulses at a frequency representative of the speed of the internal combustion engine. The time duration of the individual pulses of the monostable FF is determined by capacitor 70 and resistors 75, 76. The resistance value of resistor 76 is, however, dependent on the position of the throttle 15 in inlet manifold 13 of engine 11. Thus, upon full loading of the internal combustion engine, the resistance will be high; upon idling, the resistance of resistor 76 will be low. The monostable FF 66 therefore applies long pulses at full loading and, upon idling, short pulses to the subsequently connected low-pass filter 79, 80, 81. These pulses of a repetition rate representative of speed and of a length representative of loading appear at junction J. The low-pass filter forms an arithmetic average of these pulses, so that the voltage across capacitor 81 will be representative of the product formed of pulse frequency (motor speed) and throttle position (fuel input or engine output per engine stroke). This product is representative of the gas flow per unit time. At the reference junction R, therefore, a correction signal will be applied which corresponds to the desired correction value to shift the reference level of operational amplifier 38.

If the internal combustion engine is supplied with a fuel injection system in which the opening time of an injection valve varies with loading, then the time-average of the injection pulses (the width, or time duration of which varies with loading) will also be representative of total gas flow (fuel/air mixture) through the engine. It is, therefore, possible in such systems to omit the monostable FF circuit 66 and merely connect junction J to such a fuel injection system to have applied thereto the pulse sequence triggering the fuel injection valves; since this pulse sequence corresponds to, or is representative of total gas flow per unit time, the output from the low-pass filter at terminal R will be representative of the desired correction value.

FIG. 5a illustrates a variation in which gas flow per unit time can be derived. The circuit of FIG. 5a is identical to that of FIG. 5 except that at the break point X, the connection of slider 62 is not made to the throttle, but rather to the air flow transducer 14. The desired gas flow per unit time will be then be obtained at slider 62 and applied as a correction value to the voltage divider 36, 37 at junction R, with a time delay formed by networks 63, 64, 65, if desired.

Figure 7:
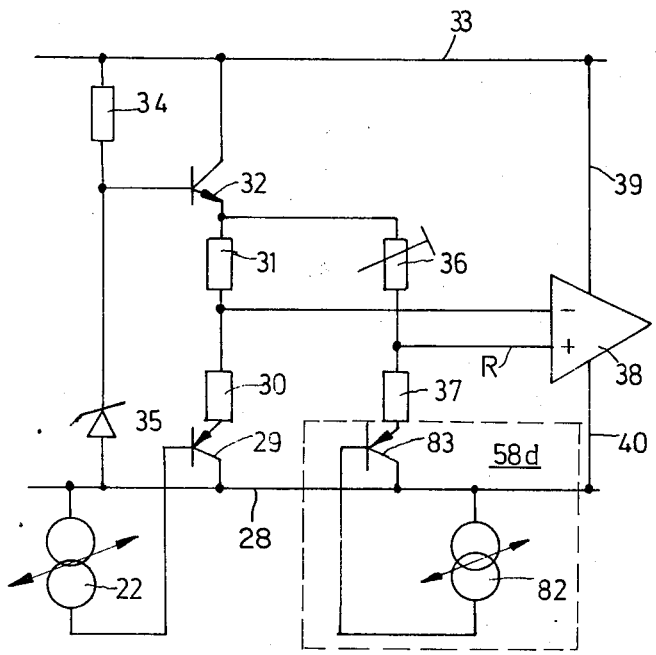
FIG. 7 is a schematic fragmentary diagram of yet another embodiment of a correction unit.

The most accurate value for the temperature of the oxygen sensor 22 is the respective maximum voltage of the oxygen sensor itself. This maximum voltage can be measured, and the switching threshold of the operational amplifier can then be set to a predetermined fraction of this maximum voltage. Referring to FIG. 7, wherein a correction unit 58d is shown: A second measuring sensor 82 is provided, and so located that it is subjected to the same exhaust gases at the same temperature or sensor 22, so that its temperature itself will be the same, or close to the same as that of the actual sensor 22. Sensor 82 is made of the same material as sensor 22, but is changed insofar that it is responsive only to the temperature of the exhaust gases without, however, being responsive to their composition; in other words, it always provided a "high" signal at the high level (FIG 2). The sensor 82 is, therefore, so constructed that a rich mixture is simulated thereto. This can be obtained, for example, by coating sensor 22 at the side facing the exhaust gas with a cover coating which does not pass oxygen ions, but which is thin enough so that the temperature of the sensor material in the sensor, itself, is not essentially affected. Sensor 22, as well as sensor 82, are for example made of zirconium oxide, the sensor 82 (FIG. 7a) is coated with an oxygen ion impervious layer 146 facing the exhaust gases. The oxygen sensor 82 then always will provide a maximum voltage corresponding to $\lambda < 1$, or rather $\lambda$ is substantially less than 1, for any one exhaust temperature; it thus provides a variable output signal of a value similar to that of the sensor 22, at the specific output temperature, and can therefore be used as a correction signal to modify the reference level of the reference junction R.

Figure 7A:
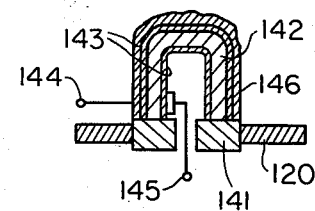
FIG. 7a is a schematic sectional view of a temperature responsive sensor.

FIG. 7a is sensor essentially composed of a closed tube 142 including a sintered solid electrolyte. The tube 142 has platinum layers 143 with micropores formed therein, the platinum layers being applied, for example, by vapor deposition. The two platinum layers 143 are supplied with electrical terminals which are connected to terminal connections 144, 145. Tube 142 is inserted in a socket 141 and located in the wall 120 of the exhaust gas, or exhaust manifold. Socket 121 is formed with a bore through which ambient outside air can penetrate into the interior of the closed tube 142. The outer surface of tube 142 is exposed to the exhaust gases. The layer 143 at the inner surface is coated with oxygen impervious layer 146.

Correction unit 58d (FIG. 7) thus uses a second sensor 82. A transistor 83 is connected in series with resistor 37; the emitter of transistor 32 is connected to the resistor 36. The base of transistor 83 is connected to the second sensor 82 which always will provide an output signal representative of the maximum voltage (assuming a rich mixture) from sensor 22 at the then existing temperature of the output gases. The direct input of operational amplifier 38 will thus have a voltage applied thereto which is modified in accordance with the resistance of transistor 83, as determined by the output voltage from the second sensor 82. The direct input of operational amplifier 38 will, therefore, have a voltage applied which depends on that derived from the second sensor 82, and relating, at any instant of time, to the maximum output voltage, at the then existing exhaust temperature or, respectively, to a predetermined fraction thereof (as determined by the voltage divider). This voltage is compared with the output voltage derived from sensor 22; operational amplifier 38, operating as a comparator, switches upon passage of the voltage in either direction between its respective operating states.

It has been found that the sensor 22, due to dead-time or dead-periods of the control loop, will provide, for short periods of time, its maximum or minimum voltages. This dead-time is due to the time lag between change in loading on the engine and change in exhaust gas temperature, that is, due to the time taken that any individual quantity of gas takes to pass through the engine while the engine is operating. Short-time maximum and minimum voltages from the sensor 22 can, therefore, be measured; the voltages so obtained will be a representative value for the then existing instantaneous temperature of sensor 22 and may be used as a reference signal, as in FIG. 7, to modify the switching threshold of operational amplifier 38.

Figure 8:
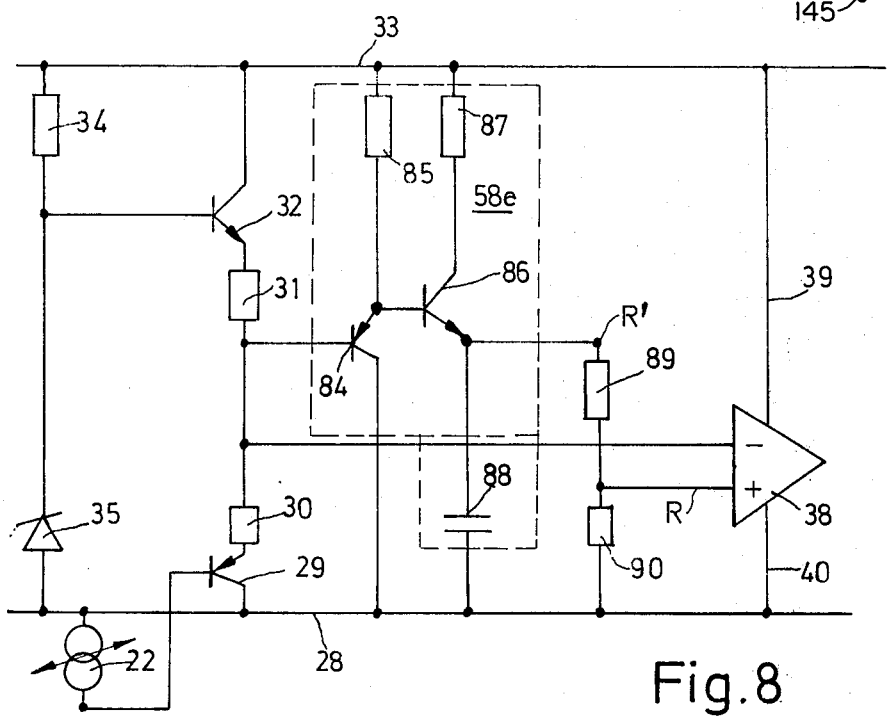
FIG. 8 is a schematic circuit diagram of yet another embodiment of a correction unit.

Referring now to FIG. 8, wherein the correction unit 58e is shown, in which short-time maximum and minimum values of the temperature of the sensor itself are used to modify the switching threshold: The junction of resistors 30, 31 is connected, as before, to the inverting input of the operational amplifier 38. Further, the base of a transistor 84 is connected to this junction; its emitter is connected over a load resistor 85 to positive bus 33, and further to the base of a transistor 86. The collector of transistor 84 is connected to chassis bus 28. The collector of transistor 86 is connected over load resistor 87 with positive bus 33; its emitter is connected on the one hand to a capacitor 88, further connected to negative bus 28 and, on the other, at junction R' to a voltage divider formed of resistors 89, 90, connected in parallel to capacitor 88. The connection between resistors 89, 90 forms the reference input junction R to the direct input of the operational amplifier 38.

Operation: The voltage at the junction between resistor 30, 31 becomes more positive or more negative depending on the output signal of sensor 22. This voltage is sensed by emitter-followers 84, 85; the voltage at the emitter of transistor 84 is higher by the emitter-base voltage of the transistor 84 than that at the junction between resistors 30, 31. The base of transistor 86 is connected to the emitter 84, so that the emitter of transistor 86 has a voltage thereat which is less by the emitter-base voltage of transistor 86. The voltage at the emitter of transistor 86 therefore corresponds to the voltage at the junction of transistors 30, 31. Capacitor 88 is charged to this voltage, so that the voltage across capacitor 88 is the same as the voltage at the junction of resistors 30, 31. If the voltage at the junction point of resistors 30, 31 drops, the base voltage of transistor 86 will likewise drop. This drop, however, causes blocking of the base-emitter diode of the transistor 86, the capacitor 28 will continue to store the prior voltage. Transistor 86 thus acts as a peak rectifier, the rectified voltage being stored in a storage circuit represented by capacitor 88. The capacitor 88 will thus store the maximum voltage of sensor 22 at the then existing exhaust temperature. A corresponding fraction of this voltage is applied over the voltage divider 89, 90 from junction R' to the actual reference junction R, at which this fraction is compared with the voltage derived from sensor 22, the operational amplifier switching between its two switching states when the threshold level at junction R is passed in either direction.

Capacitor 88 will discharge slowly across the voltage divider formed of resistors 89, 90, unless charged to a new peak value. If the temperature drops, therefore, resulting in lower peaks from sensor 22, the voltage at junction R' will be representative of this lowered peak. If the temperature increases, so that the peak voltage increases, capacitor 88 will be charged to a higher peak value.

The operating condition of the internal combustion engine in sensed, and a signal is obtained representative of this operating condition, or of temperature of the sensor 22, so that a correction signal can be applied to the control system for the exhaust emission control network to provide for optimum composition of the exhaust gases under all conditions of operation of the internal combustion engine.

Various changes and modifications may be made within the scope of the inventive concept, and features described in connection with any embodiment may be used, within the scope of the invention, with any other embodiment.

We claim:

1. In the method of removing noxious components from the exhaust gases of an internal combustion engine, in which the mass ratio of air and fuel (λ) of the air-fuel mixture applied to the engine (11) is controlled by a controller (24) in dependence on sensed composition of the exhaust gas from the engine, as sensed by a sensor (22) located to be sensitive to the exhaust stream of the engine, and providing an output signal which changes in level abruptly upon transition of the exhaust gases between reducing the oxidizing state and wherein the controller is of the threshold response type controlling said mixture as a function of the input from the sensor with respect to a threshold level, the steps of sensing gas flow of fuel-air mixture through the engine;

deriving a correction signal representative of change of level of the output signal of the sensor upon change in gas flow;

and applying said correction signal to the controller (24) to modify the response threshold of said controller as the gas flow changes.

2. Method according to claim 1, wherein the step of sensing gas flow comprises the step of sensing the position of the throttle (15) or engine controller.

3. Method according to claim 1, further comprising the step of time-delaying application of said correction signal before applying said correction signal to the controller (24).

4. Method according to claim 1, wherein the step of sensing gas flow through the engine comprises sensing the position of the throttle (15) or engine controller located in the induction pipe of the engine and deriving a throttle position signal;

sensing engine speed and deriving an engine speed signal;

and deriving a composite of said throttle position signal and said speed signal to form said correction signal.

5. Method according to claim 1, in which the engine is supplied with fuel and air by a fuel injection system having fuel injection valves, in which the duration of fuel injection time varies in dependence on engine loading, wherein the step of sensing gas flow through the engine comprises sensing the duration of fuel injection time and deriving a time-dependent fuel supply signal therefrom;

and averaging said fuel supply signal to form said correction signal.

6. Method according to claim 1, wherein the step of sensing gas flow through the engine comprises the step of sensing air flow through the inlet manifold thereof.

7. A system to remove noxious components from the exhaust gas of an internal combustion engine, comprising sensing means (22) located in sensing relation to the exhaust gases from the engine (11) and providing an output signal at respective discrete levels separated by a transition jump when the composition of the exhaust changes between reducing and oxidizing state, and in which the extent of said transition jump is temperature-dependent, means (12, 13, 16, 25) applying an air-fuel mixture to the engine;

an integral threshold controller (24) connected to and controller by the sensing means (22) and providing a control signal to said composition applying means to control the composition of said mixture, the control signal of said integral controller being a function of the output signal of said sensing means (22) with respect to the threshold level of the controller, and responding to change in output signal level upon occurrence of said transition jump in the output of the sensor (22), the controller comprising a reference means (36, 37; 89, 90) having a reference terminal (R) supplying a reference signal;

a comparator (38) connected to said sensor (22) and to said reference means, comparing the output from the sensor (22) with the reference signal and providing said control signal as a function of the level of output signal of said sensing means (22) with respect to the reference signal applied to the controller;

correction unit means (58) connected to said integral controller (24) and controlling the response threshold level thereof to compensate for changes in transition jump upon change in the temperature of the sensor;

and means sensing a parameter indicative of the temperature of the sensor (22) controlling the output of said correction unit means (58), the correction unit means (58) having its output connected to said comparator (38) to modify the comparison determinating operation of said comparator with respect to the extent of said transition jump in dependence on sensed temperature of the sensor.

8. System according to claim 7, wherein the correction unit means (FIG. 4; 58a) comprises a temperature responsive resistor (58') connected in circuit with said reference terminal (R) and changing the signal level of the reference terminal in dependence on sensed temperature.

9. System according to claim 7, wherein the correction unit means (FIG. 5: 58b) comprises a controllable resistor (61) connected in circuit with the reference terminal (2), the resistance value of said resistor being controlled in dependence on position of the operating control (15) or throttle control of the engine (11).

10. System according to claim 9, further comprising time delay means (64) connected to the reference terminal (R) and delaying effect of change of value of said resistance on the signal level at said reference terminal.

11. System according to claim 7, wherein the correction unit means (FIG. 6: 58c) comprises means sensing loading on the engine.

12. System according to claim 11, wherein the means sensing engine loading comprises means sensing engine and fuel through-put.

13. System according to claim 12, wherein the means sensing engine gas and fuel through-put comprises means (FIG. 6: 58c) sensing fuel supply per engine stroke and providing an instantaneous through-put signal;

and means (79, 80, 84) averaging said through-put signal.

14. System according to claim 13, wherein the means averaging the through-put signal comprises a low-pass filter (79, 80, 81).

15. System according to claim 13, wherein the means sensing fuel supply per engine stroke comprises a monostable flip-flop (66) triggered in synchronism with rotation of the engine, the pulse duration of the monostable flip-flop being controlled in dependence on position of the controller (15) of the engine.

16. System according to claim 7, wherein the engine comprises an air flow measuring means (14) measuring air flow to the engine;

and wherein the correction means (FIG. 5a: 58b) comprises a controllable resistor (61) connected to circuit with the reference terminal (R), the resistance value of said resistor being controlled in dependence on measured air flow.

17. System according to claim 7 wherein the correction means (FIG. 7: 58d) comprises a temperature sensor (82) located in temperature sensing relation to said exhaust gases and similar in construction to said exhaust gas sensor (22) and comprising temperature sensitive materials (142) similar to the temperature dependent exhaust gas sensitive materials (142) of said exhaust gas sensor (22), and means (146) chemically isolating said material (142) from the exhaust gases, to render said temperature sensor (82) insensitive to changes in composition of the exhaust gases.

18. System according to claim 17, wherein the means to render the sensor insensitive to chemical composition of the exhaust gases comprises a coating (146) applied to the sensor in the region of exposure to the exhaust gases, which coating is impervious to said exhaust gases but responsive to temperature changes of the exhaust gases.

19. System according to claim 7, wherein the correction means (FIG. 8: 58e) comprises a peak detector and rectifier circuit (84–87) connected to said sensor (22) and deriving peak values of signals from said sensor;

and storage means (88) storing said peak values connected in circuit with the reference terminal (R) of the comparator.

20. In a method of removing noxious components from the exhaust gases of internal combustion engines, in which the mass ratio of air-fuel ($\lambda$) of the air-fuel mixture applied to the engine is controlled in dependence on the composition of the exhaust gases from the engine, as sensed by a sensor (22) located in the exhaust stream of the engine (11) and providing an output signal which changes in level abruptly upon transition of exhaust gases between reducing and oxidizing state, and in which the signal from the sensor (22) is compared with a reference signal connected to a reference terminal (R) of a comparator (38) in an integral controller circuit controlling the mass ratio of fuel-air mixture applied to the engine, the steps of generating a correction signal representative of load on the engine, and applying said generated correction signal to the comparator (38) at the reference terminal (R) thereof to modify the reference level at the comparator (38) and hence to modify the comparison level thereof.

21. A system to remove noxious components from the exhaust gas of an internal combustion engine, comprising sensing means (22) located in sensing relation to the exhaust gases from the engine (11) and providing an output signal having a transition jump when the exhaust changes between reducing and oxidizing state, and in which the extent of said transition jump is temperature dependent;

means (12, 13, 16, 25) applying and air-fuel mixture to the engine;

and integral controller (24) having a predetermined response level connected to and controlled by the sensing means (22) and providing a control signal to said composition applying means to control and composition of said mixture, and responding to change in signal level with respect to the response level upon occurrence of said transition jump in the output of the sensor (22);

correction unit means (58) connected to said integral controller and controlling the response level thereof to compensate for changes in transition jump upon change in the temperature of the sensor;

and means directly responsive to engine operating conditions sensing a parameter of engine operation which indirectly influences the temperature of the exhaust gases, connected to and controlling the output of said correction unit means (58).

22. System according to claim 21, wherein said parameter sensing means comprising means (58; 14, 15; 61, 62; 76; 23n) sensing engine gas and fuel through-put connected to and controlling the output of said correction unit means.

23. In a method of removing noxious components from the exhaust gases of internal combustion engines, in which the mass ratio of air-fuel ($\lambda$) of the air-fuel mixture applied to the engine is controlled in dependence on the composition of the exhaust gases from the engine, as sensed by a sensor (22) located in the exhaust stream of the engine (11) and providing an output signal which changes in level abruptly upon transition of exhaust gases between reducing and oxidizing state, and in which the signal from the sensor (22) is compared with a reference signal connected to a reference terminal (R) of a comparator (38) in an integral controller circuit controlling the mass ratio of fuel-air mixture applied to the engine, the steps of generating a correction signal representative of temperature of the exhaust gases;

and applying said generated correction signal to the comparator (38) at the reference terminal (R) thereof to modify the reference level of the comparator (38) and hence to modify the comparison level thereof.

* * * * *